Patented Oct. 31, 1950

2,528,151

UNITED STATES PATENT OFFICE 2,528,151

INSECTICIDES

Marshall Kulka, Guelph, Ontario, Canada, and Herman D. Tate, Woodbridge, Conn., assignors to United States Rubber Company, New York, N. Y., a corporation of New Jersey No Drawing. Application August 6, 1947, Serial No. 766,868

6 Claims. (Cl. 167—30)

This invention relates to improvements in insecticides, and particularly to acaricides for controlling mites.

Organic chemicals are widely used to control insects. However, one group, the mites, of the order Acarida, remain as troublesome pests which are not satisfactorily controlled by commercially available insecticides.

We have found that poly(chloromethyl) benzenes are effective insecticides, particularly for controlling mites. Methods of preparing poly-(chloromethyl) benzenes are known; see the article by one of the co-applicants herein, Kulka, "Preparation of Poly(chloromethyl) benzenes," Canadian Journal of Research, B. 23:106–110, May, 1945, and references referred to therein. The expression "chloromethyl" in parenthesis in the general formula is used in its commonly accepted meaning as a mono-chloro substituted methyl radical, the general formula poly(chloromethyl) benzene thus being synonymous with poly(monochloromethyl) benzene.

The poly(chloromethyl) benzenes may be applied to loci to be protected against insects in undiluted form, or as dust when admixed with or adsorbed on powdered solid carriers, such as the various mineral silicates, e. g. mica, talc, pyrophyllite and clays, or as liquids or sprays when in a liquid carrier, as in solution in a suitable solvent, or dispersed in a suitable non-solvent medium, for example, water. In protecting plants (the term including plant parts) which are subject to attack by insects, the chemicals of the present invention are preferably applied as aqueous emulsions containing a dispersing agent. The chemicals may be used admixed with carriers that are active of themselves, for example, other insecticides, fungicides or bactericides.

The following examples illustrate the effectiveness of the chemicals of the invention as insecticides:

*Example I*

A 1% aqueous emulsion of 1,2,4-tri(chloromethyl) benzene was prepared containing 0.1% of a commercial surface-active dispersing agent, Emulphor EL, which is a reaction product of ethylene oxide and castor oil, and 0.03% of a commercial wetting agent, Nacconal NR, which is dodecyl benzene sodium sulfonate, the emulsifying and wetting agent used being non-toxic to the organisms under test.

The insecticidal value of the 1,2,4-tri(chloromethyl) benzene was tested on different insects, viz. the greenhouse red spider mite, *Tetranychas telarius*, the pea aphid, *Macrosiphum pisi*, and the Mexican bean beetle, *Epilachna varivestes*. A number of bean leaves infested with red spider mites, a number of other leaves infested with pea aphids, and still other leaves infested with Mexican bean beetles, were sprayed with the above 1% aqueous emulsion of 1,2,4-tri(chloromethyl) benzene. The leaves were then placed in separate covered petri dishes. Others of the variously infested leaves were placed in separate petri dishes without treatment as checks.

After 24 hours the mortality of red spider mites on the leaves treated with the 1,2,4-tri(chloromethyl) benzene was 100% whereas the mortality on the untreated leaves was 5.5%. The mortality of the pea aphids on the treated leaves was 93% and on the untreated leaves was 11.5%. The mortality of the Mexican bean beetles on the treated leaves was 100% whereas there were no dead beetles on the untreated leaves.

*Example II*

Other poly(chloromethyl) benzenes were tested against red spider mites and pea aphids using 1% aqueous emulsions of the chemicals with the technique described in Example I.

1,3-dimethyl - 4,6 - di(chloromethyl) benzene gave 100% mortality of mites and 86% mortality of aphids.

1,3-dimethyl - 2,4 - di(chloromethyl) benzene gave 100% mortality of mites and 43% mortality of aphids.

1,2-di(chloromethyl) benzene gave 90% mortality of mites and 75% mortality of aphids.

1,4-di(chloromethyl) benzene gave 100% mortality of mites and 100% mortality of aphids.

The untreated checks for the above tests showed 5.7% mortality of mites and 3.2% mortality of aphids after the 24 hour period for which all the tests were run.

*Example III*

An aqueous emulsion of 1,2,4-tri(chloromethyl) benzene was prepared by homogenizing 1 part of the chemical to which .03 part of Emulfor EL was added in 100 parts of water. Concentrations of 0.25% and 0.125% of the 1,2,4-tri(chloromethyl) benzene were prepared by diluting portions of the 1% emulsion as required. For tests against red spider mites, young pinto bean plants (first true leaves fully expanded) were used. The upper surface of the leaves were ringed along the outer border with a thin line of an adhesive preparation non-toxic to the organisms under test which is used on fly papers and for ringing trees. The leaves were then infested with mites. The adhesive ring served to confine the mites so that accurate counts could be made. Some leaves thus infested were sprayed with the 0.25% aqueous suspension of the 1,2,4-tri(chloromethyl) benzene, other leaves with the 0.125% suspension of the chemical, and still other infested leaves were not treated with the chemical. A count of dead and live adult mites was made after 48 hours. The 0.25% suspension of the 1,2,4-tri(chloromethyl) benzene gave 96.8% dead insects, the 0.125% suspension of the chemical gave 97.4% dead insects, whereas the checks or leaves not treated with the chemical showed no dead mites. For tests against pea aphids, broad bean plants about 12 inches in height were used. All foliage, except two leaflets on each of three leaves, was removed. These leaflets were heavily infested with aphids. Plants thus infested with pea aphids were sprayed with the 0.25% and 0.125% concentrations of the 1,2,4-tri(chloromethyl) benzene, and a check plant was left untreated as a control. At the end of 48 hours, the treatment with the 0.25% concentration of the chemical showed 76.0% dead insects, the 0.125% concentration showed 43.9% dead insects, and the untreated check plant showed 0.4% dead insects.

*Example IV*

Tests on the di(chloromethyl) benzenes shown in Example II were made against red spider mites and pea aphids at lower concentrations of the chemicals than used in Example II.

The aqueous emulsions of the chemicals were prepared by homogenizing 1 part of the chemical to which 0.1 part of Emulfor EL was added in 100 parts of water. Concentrations of 0.5% and 0.25% of the chemicals were prepared by diluting portions of the 1% emulsions as required.

In testing the chemicals against red spider mites, young pinto bean leaves (first true leaves fully expanded) were infested with mites, and the leaves were removed from the plant. Some leaves were sprayed with the 0.5% concentrations of the chemicals, some with the 0.25% concentrations, and some were left unsprayed. They were then placed in petri dishes on filter paper and held at a constant temperature of 78° F. The kill of mites was noted after 24 hours.

In testing the chemicals against pea aphids, broad bean plants about 12 inches in height were heavily infested with the aphids, the leaves removed, and some were sprayed with the 0.5% concentrations of the chemicals, others with the 0.25% concentrations, and some were left unsprayed. They were placed in petri dishes on moist filter paper and held at 78° F. in a constant temperature chamber. The kill of aphids was noted after 24 hours.

The 1,3-dimethyl-4,6-di(chloromethyl) benzene at 0.5% concentration showed 100% kill of mites and 78.3% kill of aphids, and at 0.25% concentration showed 100% kill of mites and 64.1% kill of aphids.

The 1,3-dimethyl-2,4-di(chloromethyl) benzene at 0.5% concentration showed 100% kill of mites and 51.2% kill of aphids, and at 0.25% concentration showed 99.2% kill of mites and 30.7% kill of aphids.

The 1,2-di(chloromethyl) benzene at 0.5% concentration showed 100% kill of mites, 95.7% kill of aphids, and at 0.25% concentration showed 95% kill of mites and 32.3% kill of aphids.

The 1,4-di(chloromethyl) benzene at 0.5% concentration showed 100% kill of mites and 56.0% kill of aphids, and at 0.25% concentration showed 92.8% kill of mites and 55.2% kill of aphids.

The infested leaves not treated with a chemical showed mortalities of 5.4% for the mites and 1.7% for the aphids.

Having thus described our invention, what we claim and desire to protect by Letters Patent is:

1. An insecticidal composition having particular effectiveness for controlling mites and aphids comprising a poly(monochloromethyl) benzene and a surface-active dispersing agent.

2. An insecticidal composition having particular effectiveness for controlling mites and aphids comprising an aqueous emulsion of a poly(monochloromethyl) benzene, said aqueous emulsion containing a surface-active dispersing agent.

3. An insecticidal composition having particular effectiveness for controlling mites and aphids comprising 1,2,4-tri(monochloromethyl) benzene and a surface-active dispersing agent.

4. An insecticidal composition having particular effectiveness for controlling mites and aphids comprising an aqueous emulsion of 1,2,4-tri-(monochloromethyl) benzene, said aqueous emulsion containing a surface-active dispersing agent.

5. An insecticidal composition having particular effectiveness for controlling mites and aphids comprising a di(monochloromethyl) benzene and a surface-active dispersing agent.

6. An insecticidal composition having particular effectiveness for controlling mites and aphids comprising an aqueous emulsion of a di(monochloromethyl) benzene, said aqueous emulsion containing a surface-active dispersing agent.

MARSHALL KULKA.
HERMAN D. TATE.

REFERENCES CITED

The following references are of record in the file of this patent:

UNITED STATES PATENTS

| Number | Name | Date |
| --- | --- | --- |
| 1,841,458 | Taube | Jan. 19, 1932 |
| 2,071,875 | Englemann | Feb. 23, 1937 |
| 2,121,330 | Scherer | June 21, 1938 |
| 2,189,570 | Schechter | Feb. 6, 1940 |
| 2,266,737 | Bruson | Dec. 23, 1941 |
| 2,455,643 | Bakalar | Dec. 7, 1948 |